Patented Oct. 19, 1937

2,096,114

UNITED STATES PATENT OFFICE 2,096,114

METHOD FOR REDUCING THE VISCOSITY OF ARALKYL ETHERS OF CELLULOSE

Eugene J. Lorand, Wilmington, Del., assignor to Hercules Powder Company, Wilmington, Del., a corporation of Delaware No Drawing. Application May 5, 1934, Serial No. 724,206

17 Claims. (Cl. 260—152)

This invention relates to a method for reducing the viscosity of aralkyl ethers of cellulose, as, for example, benzyl cellulose, xylyl cellulose or xylyl ether of cellulose, beta-phenyl-ethyl ether of cellulose, etc.

Heretofore low viscosity aralkyl celluloses have been obtained in various ways as, for example, by the proper choice and treatment of the raw materials and by conducting the aralkylation of the cellulosic material under conditions favoring a depolymerization of the cellulose molecule.

Again, it has been suggested to reduce the viscosity of benzyl celluloses by digestion with water and steam under pressure in the presence of a benzyl halide, as benzyl chloride. Such procedure, however, is undesirable for various reasons among which are that most of the benzyl chloride used in the benzylation must be removed by vacuum distillation, the size of the apparatus must be greatly increased to take up the large amount of water and steam and the further handling of the resultant pasty product is difficult.

Now, in accordance with this invention, it has been found that the viscosity of aralkyl cellulose can be reduced by treatment at an elevated temperature with a benzyl halide alone, i. e. without the use of water or steam. The aralkyl halide may, for example, be benzyl chloride, xylyl chloride, beta-phenyl-ethyl chloride, etc. The treatment may be applied on completion of the aralkylation or as a subsequent procedure.

Generally speaking, the method in accordance with this invention is adaptable for reducing the viscosity of aralkyl cellulose ethers produced, for example, by the action of benzyl chloride or one of its homologues on alkali cellulose.

In carrying this invention into practice, for example, the treatment for viscosity reduction may be applied to an aralkyl cellulose after its production, or in the course of its production.

Thus, by way of example, a solution of aralkyl cellulose, as, for example, benzyl cellulose, in an aralkyl halide, as, for example, benzyl chloride, is subjected to an elevated temperature for such period as is necessary to effect the desired viscosity reduction.

The solution of aralkyl cellulose in an aralkyl halide may be of any desired concentration. Generally speaking a concentration within about the range 5–30% will be found satisfactory, while satisfactory results may be obtained using, for example, a 10% solution. The temperature at which the treatment is carried out may vary within wide limits, since the temperature within wide limits will determine the time required to obtain the desired reduction in viscosity. In general, temperatures within say about the range 50–100° C. will be found desirable and the period of treatment will depend upon the temperature used and the degree of viscosity drop desired.

As more specifically illustrative, for example, a 10% solution of benzyl cellulose may be used. The viscosity of the solution on heating for six hours at 80° C., assuming it to have had an initial viscosity of 1555 centipoises as measured with a horizontal capillary viscosimeter, will be found to have been reduced to about 116 centipoises.

In carrying this invention into practice, as has been indicated, the treatment for reducing viscosity may be included as a part of the preparation of the ether. In so proceeding, it has been found necessary to eliminate the protective action on the cellulose ether of caustic alkali remaining in the reaction mass on completion of the aralkylation. Hence, on completion of the aralkylation the alkali content of the mass is determined by any suitable method and an amount of alkali binding agent such as an acid or an acid salt, as, for example, acid sodium sulphate, monobasic sodium phosphate, oxalic acid, etc. is added and the mass containing usually about 15% of aralkyl cellulose in solution in the excess of aralkyl halide normally used in aralkylation is then heated in an oil bath with vigorous stirring for such time as is required to effect the desired viscosity reduction.

In carrying out the method in accordance with this invention, as a part of the preparation of the ether it will be noted that reduction in viscosity of the aralkyl cellulose will be inhibited by the presence of residual caustic alkali in the reaction mass due to the fact that the residual caustic alkali protects the cellulose ether from the depolymerizing effect of the aralkyl halide. As a consequence the use of an alkali binding compound, such as an acid or an acid salt, is necessary and it has been found that a substantial excess of alkali binding compound, as, for example, more than 100% excess, is required in order to obtain viscosity reduction on subsequent heating of the reaction mass, which comprises aralkyl cellulose in solution in an excess of aralkyl halide used in its production.

As more specifically illustrative, for example, in a benzyl cellulose reaction mass, containing about 15% benzyl cellulose, the caustic content is determined by, for example, adding to a sample amounting to 0.6–1.0 g. 15–20 cc. alcohol to coagulate the benzyl cellulose, produced by the usual treatment of alkali cellulose with an excess of benzyl chloride. Hardening of the mass is helped by maceration with two glass rods. When the sample is sufficiently broken up, the whole is washed over with 100-150 cc. water and 10 cc. half-normal hydrochloric acid added. After 5 to 10 minutes the excess acid is back-titrated with half-normal sodium hydroxide solution in the presence of methyl orange, as an indicator. From the result the alkali content of the mass is calculated in the usual manner.

Assuming that the reaction mass to be treated for reduction of the viscosity of the benzyl cellulose amounts to 200 g. and contains 2.4 g. of caustic alkali, there is added to the mass about 20 g. of acid sodium sulphate though theoretically 6.3 grams would be sufficient to neutralize the caustic alkali present.

After addition of the acid sodium sulphate, which, as will be clear, acts as an alkali binding agent, the mass is heated in an oil bath at a temperature of say 105° C. for about 2 to 3 hours with vigorous mechanical stirring. As a result of the treatment the reaction mass will become a limpid liquid, from which the benzyl cellulose may be precipitated, as, for example, with ether. The precipitate is washed with alcohol and then with water and after the product is dried, it is extracted with methanol.

Assuming that the specific viscosity of the benzyl cellulose before treatment in accordance with this invention, as measured in a ½% xylene-butanol (80:20 by weight) solution, with an Ostwald viscosimeter, was 0.634, the viscosity of the treated benzyl cellulose in similar solution will be found to have been reduced to about 0.332.

It will be understood that the method in accordance with this invention from the broad standpoint involves the heating of an aralkyl cellulose in solution in an aralkyl halide, the solution being non-aqueous or substantially non-aqueous. It will be appreciated that the method may be applied to aralkyl cellulose after completion of the aralkylation process and recovery of the product or, as has been indicated, as a part of the preparation of the ether, after completion of the aralkylation but before recovery and purification of the product.

It will be appreciated that this invention is not dependent upon the use of any particular temperature, time, or concentration of solution, nor is this invention to be limited by details of procedure, time, and temperature given herein for purposes of illustration and clarification of the invention.

What I claim and desire to protect by Letters Patent is:

1. The method of producing a low viscosity aralkyl cellulose, which includes aralkylating an alkali cellulose in the presence of an excess of an aralkyl halide, adding to the reaction mass an alkali binding compound in amount substantially in excess of that theoretically necessary to neutralize residual alkali in the reaction mass and heating the reaction mass.

2. The method of producing a low viscosity aralkyl cellulose, which includes aralkylating an alkali cellulose in the presence of an excess of an aralkyl halide, adding to the reaction mass an alkali binding compound in amount more than 100% in excess of that theoretically necessary to neutralize residual alkali in the reaction mass and heating the reaction mass.

3. The method of producing a low viscosity benzyl cellulose, which includes benzylating an alkali cellulose in the presence of an excess of benzyl chloride, adding to the reaction mass an alkali binding compound in amount substantially in excess of that theoretically necessary to neutralize residual alkali in the reaction mass and heating the reaction mass.

4. The method of producing a low viscosity aralkyl cellulose, which includes aralkylating an alkali cellulose in the presence of an excess of an aralkyl halide, adding to the reaction mass an alkali binding compound comprising an acid in amount substantially in excess of that theoretically necessary to neutralize residual alkali in the reaction mass and heating the reaction mass.

5. The method of producing a low viscosity aralkyl cellulose, which includes aralkylating an alkali cellulose in the presence of an excess of an aralkyl halide, adding to the reaction mass an alkali binding compound comprising an acid salt in amount substantially in excess of that theoretically necessary to neutralize residual alkali in the reaction mass and heating the reaction mass.

6. The method of producing a low viscosity aralkyl cellulose, which includes aralkylating an alkali cellulose in the presence of an excess of an aralkyl halide, adding to the reaction mass acid sodium sulphate in amount substantially in excess of that theoretically necessary to neutralize residual alkali in the reaction mass and heating the reaction mass.

7. The method of producing a low viscosity benzyl cellulose, which includes benzylating an alkali cellulose in the presence of an excess of benzyl chloride, adding to the reaction mass acid sodium sulfate in amount substantially in excess of that theoretically necessary to neutralize residual alkali in the reaction mass, and heating the reaction mass.

8. The method of producing a low viscosity benzyl cellulose, which includes benzylating an alkali cellulose in the presence of an excess of benzyl chloride, adding to the reaction mass monobasic sodium phosphate in amount substantially in excess of that theoretically necessary to neutralize residual alkali in the reaction mass, and heating the reaction mass.

9. The method of producing a low viscosity benzyl cellulose, which includes benzylating an alkali cellulose in the presence of an excess of benzyl chloride, adding to the reaction mass oxalic acid in amount substantially in excess of that theoretically necessary to neutralize residual alkali in the reaction mass, and heating the reaction mass.

10. The method of reducing the viscosity of an aralkyl cellulose, which includes heating an aralkyl cellulose in solution in an aralkyl halide in the substantial absence of water.

11. The method of reducing the viscosity of benzyl cellulose, which includes heating benzyl cellulose in solution in benzyl chloride in the substantial absence of water.

12. The method of reducing the viscosity of an aralkyl cellulose, which includes heating an aralkyl cellulose in solution in an aralkyl halide under acid conditions.

13. The method of reducing the viscosity of benzyl cellulose, which includes heating benzyl cellulose in solution in benzyl chloride under acid conditions.

14. The method of reducing the viscosity of an aralkyl cellulose, which includes heating a 5%-30% solution of an aralkyl cellulose in an aralkyl halide in the substantial absence of water.

15. The method of reducing the viscosity of an aralkyl cellulose, which includes heating an aralkyl cellulose in solution in an aralkyl halide in the substantial absence of water at a temperature of from about 50° to about 100° C.

16. The method of reducing the viscosity of an aralkyl cellulose, which includes heating an aralkyl cellulose in solution in an aralkyl halide under acid conditions at a temperature of from about 50° to about 100° C.

17. The method of reducing the viscosity of benzyl cellulose, which includes heating benzyl cellulose in solution in benzyl chloride in the substantial absence of water at a temperature of about 105° C. for about 2–3 hours.

EUGENE J. LORAND.